324-77.

11-16-71  XR  3,621,404  SR

[11] 3,621,404

| [72] | Inventor | Sven Hakan Sjogren<br>Civilingenjar Hakan Sjogren 23, Dolvagen 183, 40, Taby, Sweden |
| --- | --- | --- |
| [21] | Appl. No. | 760,953 |
| [22] | Filed | Sept. 19, 1968 |
| [45] | Patented | Nov. 16, 1971 |
| [32] | Priority | Sept. 20, 1967 |
| [33] | | Sweden |
| [31] | | 12940/67 |

[54] SIGNAL LEVEL CONTROL INSTRUMENT FOR SOUND TRANSMISSION SYSTEMS
1 Claim, 4 Drawing Figs.

[52] U.S. Cl.................................................. 328/162,
    324/77 B, 324/119, 328/134
[51] Int. Cl.......................................................... G01r 23/16
[50] Field of Search............................................. 330/149;
    328/134, 151, 162; 324/77 B, 119, 128

[56] References Cited
UNITED STATES PATENTS

| 2,255,502 | 9/1941 | Bousman........................ | 324/119 X |
| --- | --- | --- | --- |
| 2,520,766 | 8/1950 | Hathaway...................... | 324/128 X |
| 2,578,348 | 12/1951 | Gannett......................... | 324/128 |
| 3,434,056 | 3/1969 | Becker.......................... | 328/162 X |

*Primary Examiner*—Roy Lake
*Assistant Examiner*—James R. Mullins
*Attorney*—Waters, Roditi, Schwartz & Nissen

ABSTRACT: This disclosure relates to signal level control instruments for sound transmission systems comprising a signal top value measuring instrument for indicating a maximal reference volume for a high quality sound signal transmission in the system without exceeding a desired maximum distortion of the signal and, in particular, transient signals of short duration. The invention teaches the use in combination with a signal top value measuring instrument of a weighing network inserted between the top value measuring instrument and the transmission chain, the output signal of which is to be measured, said weighing network having an attenuation function being essentially an image function of a function defining the maximum input signal level versus frequency for a predetermined relative intermodulation distortion. This function is obtainable for a particular signal transmission chain by aid of conventional intermodulation measuring instruments in accordance with CCIF standard, for instance, and is in the following referred to as tolerance characteristic of the transmission chain.

SIGNAL LEVEL CONTROL INSTRUMENT FOR SOUND TRANSMISSION SYSTEMS

BACKGROUND

A technician of a sound production studio has, amongst others, to determine the maximum signal level to be used in the transmission chain used, and when doing so to judge two important items, namely:

a. that a desired difference in sound level between different types of programs is being maintained, and b. that the overall gain is kept such that the maximum signal level during a program is maintained below a specific maximum level at which distortion and intermodulation is still below a predetermined value, acceptable for the transmission in question, the maximum sound level, however, to effectively make use of the technical features of the transmission chain is to be as high as possible.

To this effect, it belongs to common practice and is desirable that the gain to be used in the transmission chain and the maximum signal level therewith is obtained and selected by aid of measuring instrument. Dependable instruments to make possible a determination according to point (a) above are available on the market, while instruments intended to be used in a sound production studio for determining a maximum signal level according to point (b) and which are available on the market are not capable of presenting to the sound technician an information about the gain level to be used to obtain a high quality transmission.

The instruments at present in use for proceeding according to point (b) above are mainly of two types, namely:

A. Mean value indicating reference volume instruments having standardized ballistic datas, so called VU-meters, and B. peak value indicating instruments of mirror galvanometer type having building-up times of about 20 msec.

However, to obtain a result of a measurement of this kind which could be reasonably considered as acceptable in respect of a high quality sound reproduction, it should not deviate more than about 1 db. from the correct value, and this irrespective of the frequency composition and peak factor of the program, which does, however, entirely exclude the use of instruments according to (A) for the measurement in question.

For a high-quality transmission of sound frequency over a transmission chain, that is, such a transmission that nonlinear distortions are not disturbing when listening to sound reproduced from signals which have passed the transmission chain, it is an important requirement that attention is paid to pulses as short as 1 msec. In particular a measurement over such short times is necessitated with respect to the steadily increased demands as regards sound quality when transmitting and reproducing transient sounds having steep flanks.

All this leads to the situation that neither a use of an instrument according to (B) above presents to the sound technician a possibility correctly to judge the gain control according to point (b) above.

Some transmission chains have been given a smaller dynamic in the high-frequency range than in the base range and one of the reasons thereto is a desire that the probability of reaching a maximum signal level shall be the same for all frequencies. The decreased dynamic is often obtained by increasing the level of the high frequencies on the transmitter or recording side, necessitating decrease of the high frequency level on the receiver or reproducer side, and leads to a higher signal-noise-ratio. When doing so, it has been presumed that the frequency composition be the same for all sounds, wherefore instruments according to (A) as well as instruments according to (B) have been constructed with a frequency curve as straight as possible. However, this presumption is by no means in accordance with reality, leading to the result that, for a normal program material and by use of instrument according to (B), errors as large as 25 db. in the measured values of the maximum signal level are obtained.

The purpose of the present invention is to provide a signal level control instrument of the kind referred to which presents to the sound technician a dependable information in respect of the maximally allowable excitation level.

To this effect a signal level control instrument for determining the maximal level of a signal comprises a weighing network so dimensioned, that the attenuation thereof as a function of frequency is is an image function relative to the intermodulation tolerance of of the transmission chain as a function of frequency, and a peak value indicating measuring instrument connected to the filter, the intermodulation tolerancy of the transmission chain being defined as the relative magnitude of an input signal applied to the input of the transmission chain and consisting of at least two different frequencies, a measuring frequency signal and a signal of different frequency and having a predetermined constant frequency distance from the measuring frequency and a predetermined magnitude relative to the measuring frequency signal, and which at the output terminals of the transmission chain causing an intermodulation distortion of a predetermined relative magnitude.

To illustrate the conception intermodulation tolerance, the example more closely described in the following specification is taken, the intermodulation tolerance in db. as a function of the frequency being representable by a substantially straight line within the frequency range of interest for the transmission, said line following a function of the type $a=b-k\cdot(f-f_o)$, where $a$ is the amplitude of the input signal in db. for a predetermined relative intermodulation distortion at the output terminals of the transmission chain for the measuring frequency, $b$ is the input signal level for a particular frequency $f_o$ and the same relative intermodulation distortion, and $k$ is a constant positive factor having the dimension db./Hz., in which case the weighing network of the level control instrument shall be so dimensioned as to obtain an attenuation substantially corresponding to the function $d=d_0+k(f-f_o)$, where $d_o$ is the attenuation in db. at frequency $f_o$.

Within the frequency range of interest for the transmission the function should preferably be within 1 db. from the ideal to give a very satisfactory result, but may deviate therefrom up to 2 to 3 db. and still give an acceptable measuring result.

In a preferred embodiment of an instrument according to the invention, the peak value indicating measuring instrument comprises a series circuit consisting of a rectifier and a capacitor connected to an output circuit of the weighing network, and an indicating instrument connected to the capacitor. The design and dimensioning of the weighing network is made by guidance of the measuring result when measuring the tolerance of the transmission chain to be used, that is to say by measuring at different frequencies of the frequency range in question the magnitude of the input signal tolerated by the transmission chain to present at the output thereof a signal having a determined relative intermodulation distortion, thus obtaining the tolerance as a function of frequency. For this purpose a measuring of the intermodulation distortion may, for instance, be made in accordance with CCIF standard.

When executing this measurement, the magnitude of the determined intermodulation distortion for which the measurement is effected is, in principle, not essential. Conveniently, the measurement may be effected at a distortion level which is as a rule considered as acceptable for a transmission chain, that is, in the size of order 1–5 percent, for instance at 3 percent intermodulation distortion.

DESCRIPTION OF DRAWING

The foregoing and other advantages will appear more fully from the following description in connection with the accompanying drawing, in which.

DESCRIPTION OF AN EMBODIMENT

Figure 1:
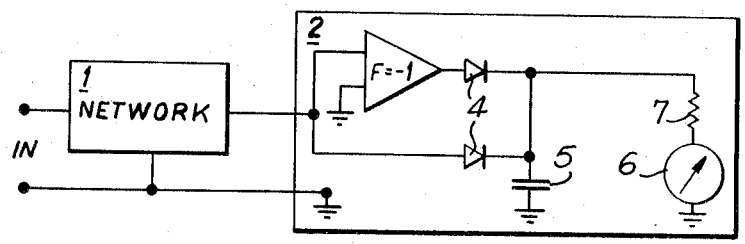
FIG. 1 is a block circuit illustrating an instrument according to the invention.

FIG. 1 schematically shows an embodiment of a signal level indicating instrument according to the invention, the instrument comprising a weighing network 1, the signal transmission properties of which are selected by guidance of the intermodulation distortion tolerance of the transmission chain for which the instrument is to be used. The output terminals of the filter are connected to a peak value indicating measuring instrument, shown as a block 2 and as illustrated symbolically shown as being of the kind known per se, in which the signal applied to the instrument pass on to rectifiers 4, one of said rectifiers immediately receiving the input signal and the other said signal after it has passed a phase inverter 3, the rectifiers 4 being together connected to a capacitor 5, the voltage of which is measured by means of a fast indicating instrument 6, the time constant of the circuit including the capacitor 5, the indicating 6 and a resistor 7 being so selected that the indicating instrument is capable of indicating peak valves having a durability of in the size of order 1 msec. with an acceptable accuracy. Peak value indicating instruments are as such well known to the art. Evidently, any embodiment of such an instrument could be used in connection with the invention, if only it fulfills the demand thereon, with a required accuracy to indicate amplitudes with sufficiently short duration, that is about 1 msec.

The network 1 is so dimensioned that it accounts for the intermodulation distortion of the entire transmission chain to be supervised with the instrument. For the dimensioning of the network, each link of the transmission chain can be separately investigated as to the frequency dependence of the intermodulation distortion. This investigation can be effected in the following manner, which is as such well known, while conveniently applying a standard method as defined by CCIF.

Figure 2A:
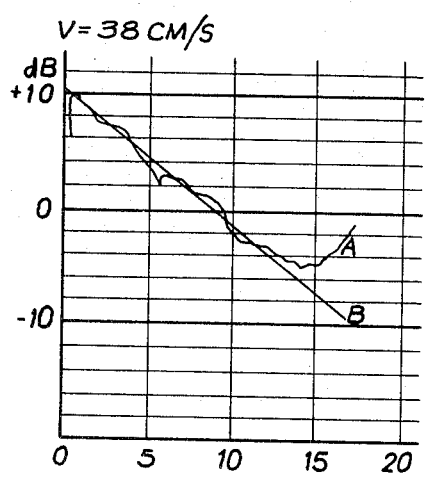
FIGS. 2A and 2B show curves relating to the tolerance of a transmission chain comprising a tape recorder and by using recording tapes of specific, different types and for different tape velocities and while adjusting the input signal to the transmission chain to a valve presenting an intermodulation distortion of 3 percent.
Figure 2B:
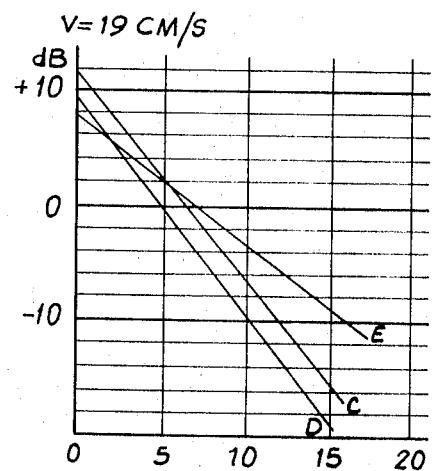

For this purpose, a measuring signal comprising two sinusoidal signals of the same amplitude and having a constant frequency difference, which signals are applied to the input terminals of the transmission chain as a whole, or, when investigating each link separately, of a link, whereafter the frequency of the measuring signal is varied from a lowest frequency, usually 20 Hz. to the highest frequency for which the transmission chain is intended, 20 kHz. The input amplitude of the measuring signal is then adjusted to such a value that the intermodulation between the two sine signals adopts a predetermined although arbitrary value, 3 percent for instance, at which the measurements illustrated by FIGS. 2A and 2B are effected. Intermodulation products up to at least the second order are to be included in the measurement.

When, in this manner, the level of the intermodulation at the output terminals of the transmission chain is maintained at a constant valve, the level variation of the measuring signal as a function of the frequency will represent a measure of the excitation properties of the transmission chain, or, as the case any be, the measured link thereof, or, with other words, the "-tolerance" of the chain or link, respectively, as regards the magnitude of the input signal at different frequencies.

Thereafter a network 1 for measurement in combination with the transmission chain thus measured, is dimensioned so that the attenuation thereof as a function of the frequency will be the mirror function of the distortion tolerance of the transmission chain thus obtained.

An example illustrating the dimensioning of a network 1 for a signal level instrument according to the invention is more closely described below in connection with tape recorders for recording sound to be reproduced from the tape with a distortion not exceeding a desired level.

Generally speaking, the situation when dealing with high quality equipment is such, that intermodulation distortion of high quality amplifiers used for the purpose can be neglected as well when measuring the signal transmission chain for obtaining the magnitudes required for dimensioning the network, as when using the instrument in the same or a similar transmission chain. Thus, as extensive experiments show, the intermodulation distortion tolerance of a transmission chain comprising amplifiers suitable for the purpose, is substantially determined by the properties of the recording tape.

Similar aspects are valid also in respect of other transmission chains, such as radio transmitters and receivers, where, as a rule, the intermodulation tolerance of discriminators and similar equipment is decisive for the intermodulation tolerance of the entire transmission chain.

FIGS. 2A and 2B show curves obtained by measuring the intermodulation distortion present in a signal obtained while reproducing a signal recorded on a tape recorder as described above, while adjusting the input signal to the recorder to such a valve at the different frequencies which are swept while measuring, that the intermodulation distortion is maintained at 3 percent.

In extensive investigations in respect of a plurality of different types of recording tape and use of these tapes on tape recorders of different manufacture, it has been found that, for a transmission chain of this type, the properties of the recording tape are the ones which are substantially exclusively decisive for the intermodulation tolerance of the transmission chain, and, furthermore, that the intermodulation tolerance of a particular tape varies with the tape speed used for the recording.

Furthermore, the investigations show that the intermodulation distortion tolerance in db. of a tape is a substantially linear function falling with frequency, the linearity of the function being an important feature with respect to the possibility of selecting weighing networks for a particular tape and a particular tape speed of, generally, very simple design, while maintaining possible errors in the correspondence between the network attenuation curve and the intermodulation distortion tolerance curve of the transmission chain within tolerable limits.

FIG. 2A illustrates the result of a measurement of a transmission chain in which a recording tape of a first manufacture (Agfa PER 555) is used in a tape recorder of a first manufacture (Telefunken M5) while using a tape velocity $v=38$ cm./sec., the intermodulation distortion being maintained at 3 percent. Curve A represents the magnitude of the input signal vs. frequency, the signal level in db. at the recording tape being selected relative to 32 mM./mm. From the lowest frequencies, the lowest one for the measurement being 20 Hz. up to 13 kHz. curve A substantially follows a straight line, represented by line B. The deviation between curve A and line B for frequencies above about 13 kHz. are referable to the fact that the frequency characteristic of the tape recorder amplifier drops in a corresponding manner at frequencies above 13 kHz. while said characteristic is substantially linear up to this frequency.

Figure 3:
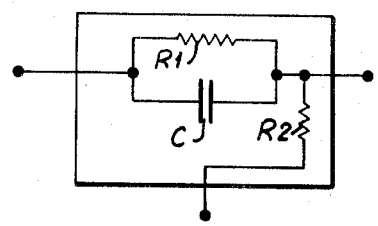
FIG. 3 is an example of a weighing network to be used in the signal level instrument according to the invention when supervising a transmission chain comprising a tape recorder working with a tape speed of 38 cm./sec. and with the recording tape, the recording tape, the properties of which are illustrated by FIG. 2A constituting part of the transmission chain.

This rather remarkable fact, the linearity of the intermodulation distortion tolerance of recording tapes, the physical background of which has as yet not been explained satisfactory, leads, when using the invention for the important kind of transmission chains, for which the invention is of importance, to the advantages result, that the network 1 for a signal level instrument according to the invention can, as mentioned above, be a very simple one. Thus, a weighing filter to be used in connection with the recording tape, the properties in this respect are illustrated in FIG. 2A and for the tape velocity 38 cm./sec., would be dimensioned as illustrated in FIG. 3. The network comprises a series link consisting of a resistor R1 and a capacitor C having the values 22 kohm and 2,5 nF., respectively, and with parallel resistor R2 connected across the input circuit of the peak value indicating instrument and having the resistance 4,7 kohm.

In FIG. 2B, line C illustrates the tolerance as defined above of the same recording tape when used in the same tape recorder, although with a tape velocity of 19 cm./sec. Line C corresponds, within the measuring tolerances, the total distortion tolerances of the tape recorder up to about 13 kHz. above which frequency the distortion tolerance increases in a similar manner as curve A of FIG. 2A due to the frequency response of the tape recorder amplifier. Line D of FIG. 2B represents the distortion tolerance of the same tape (Afga PER 555) when using this tape on a second tape recorder (Revox G), the slope of this line D being substantially the same as the slope of line C, although the signal level is a different one relative to 0 db.=32 mM./mm. Measurements on further tape recorders show that one and the same tape leads to a specific network design for a particular tape velocity.

Line E, finally, shows the tolerance function of a second tape (Agfa PER 555) when using the tape speed 19 cm./sec. Evidently, a network of the simple kind illustrated in FIG. 3 is adaptable to be used for an instrument according to the invention, although the components are to be given other values of resistances and capacitance, respectively.

It will be apparent that deviations may be made from the shown embodiments without departing from the main theme of invention set forth in the following claims.

1. A signal level instrument for determining a maximal level of an input signal to a transmission system for transmitting alternating current signals to maintain the signal distortion of the system below a predetermined value, said instrument comprising, in combination, a weighing network for attenuating a signal as a function of frequency, said attenuating characteristics being an image function relative to the intermodulation tolerance of a transmission chain as a function of frequency, and a peak value indicating measuring instrument connected to said weighing network, the intermodulation tolerance of the transmission chain being defined as the relative magnitude of an input signal applied to the input of the transmission chain and consisting of at least two different frequencies, a measuring frequency signal and a signal of different frequency and having a predetermined constant frequency difference from the measuring frequency and a predetermined magnitude relative to the measuring frequency signal, and an intermodulation distortion of a predetermined relative magnitude being produced at the output terminals of the transmission chain.